July 4, 1967  R. DULIEU  3,329,255
DEVICE FOR HANDLING ELONGATE OBJECTS
Filed Oct. 11, 1965  5 Sheets-Sheet 2
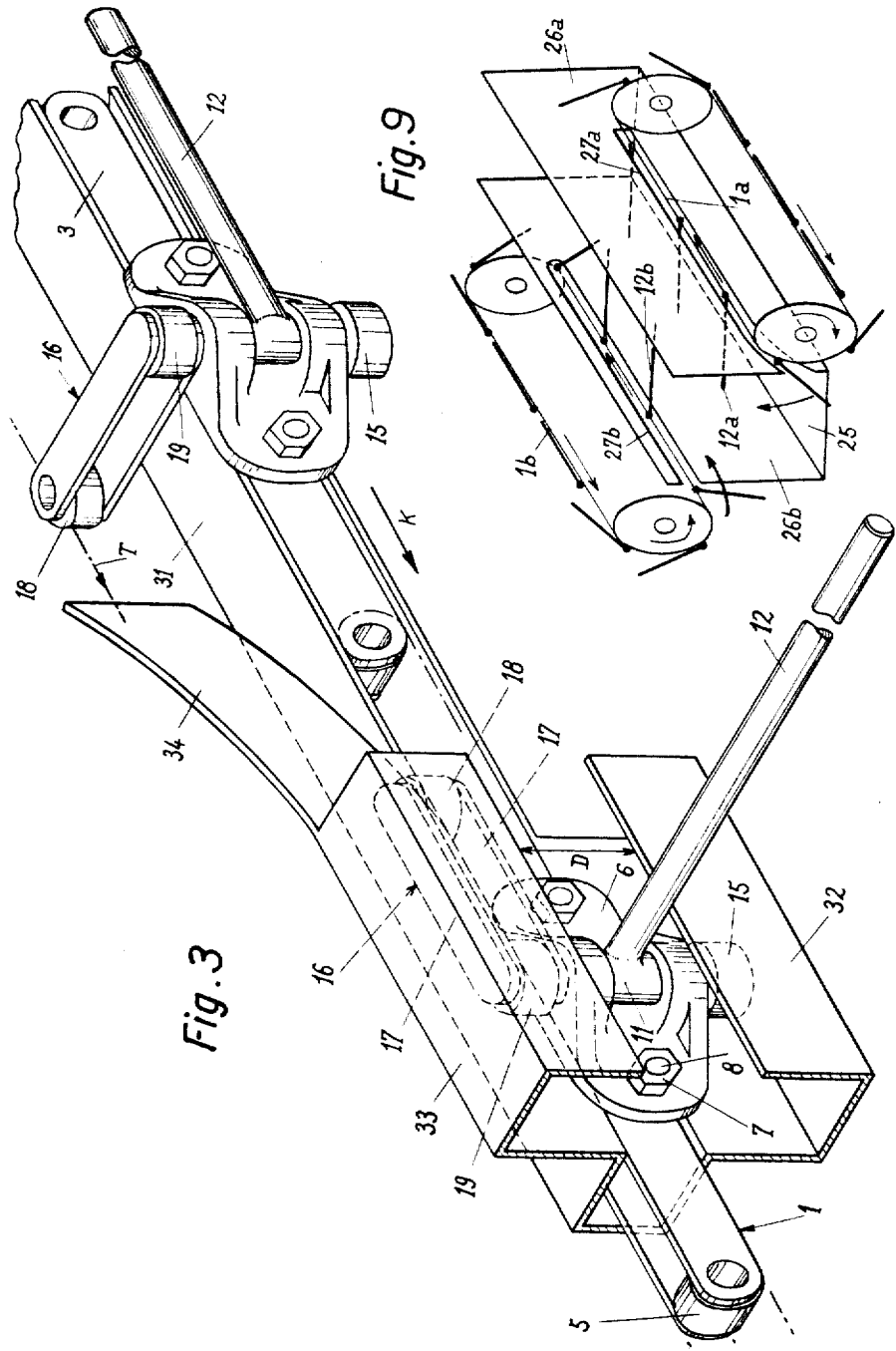
INVENTOR
RAOUL DULIEU
BY Young + Thompson
ATTYS.

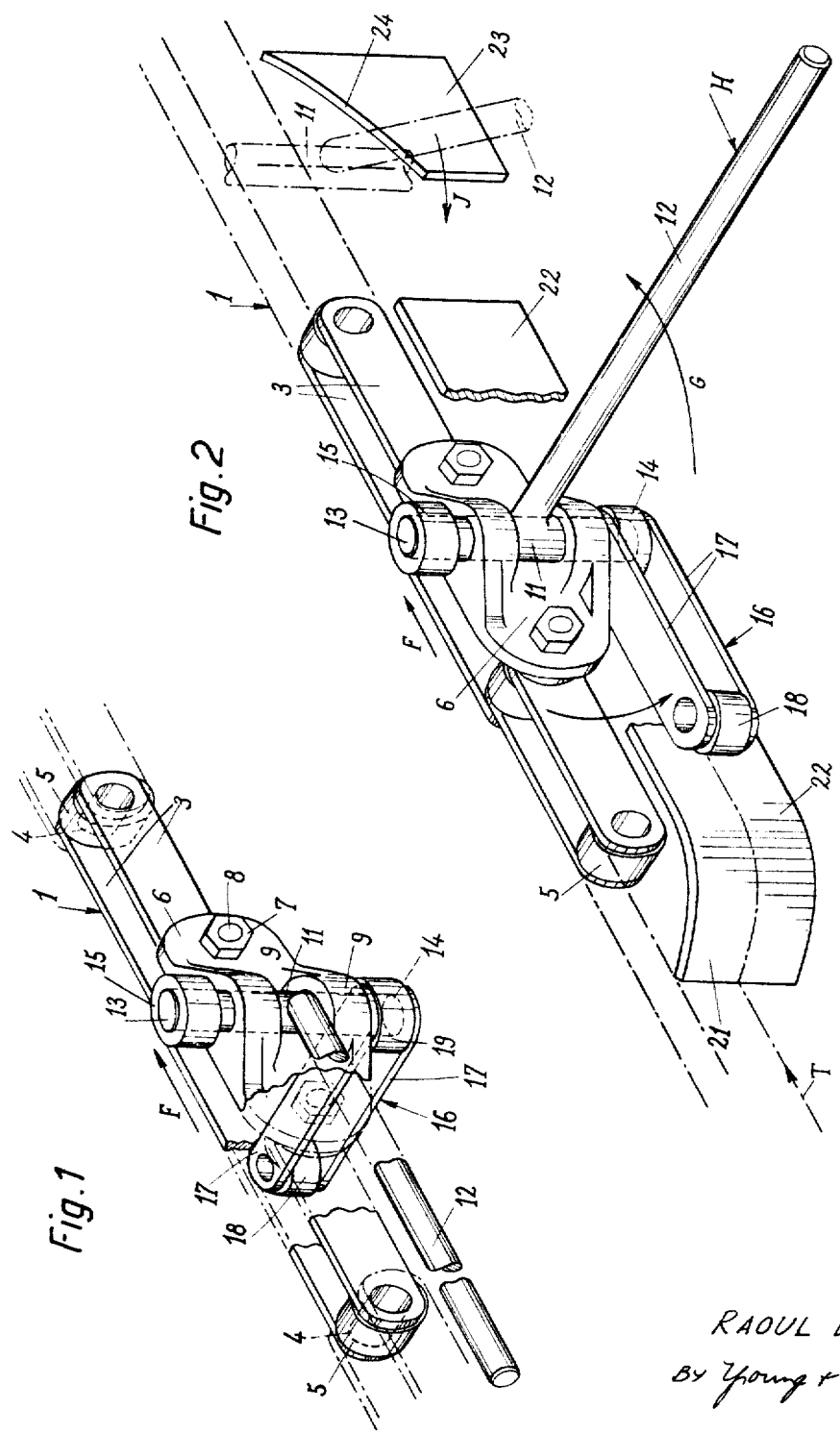

July 4, 1967 R. DULIEU 3,329,255
DEVICE FOR HANDLING ELONGATE OBJECTS
Filed Oct. 11, 1965 5 Sheets-Sheet 4
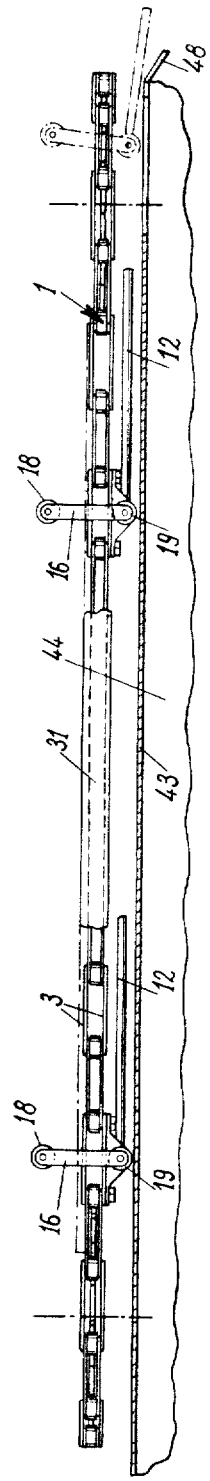
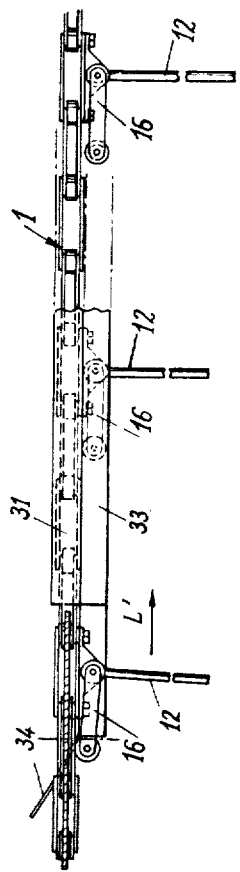
INVENTOR
RAOUL DULIEU
By Young & Thompson
Attys.

July 4, 1967  R. DULIEU  3,329,255
DEVICE FOR HANDLING ELONGATE OBJECTS
Filed Oct. 11, 1965  5 Sheets-Sheet 5
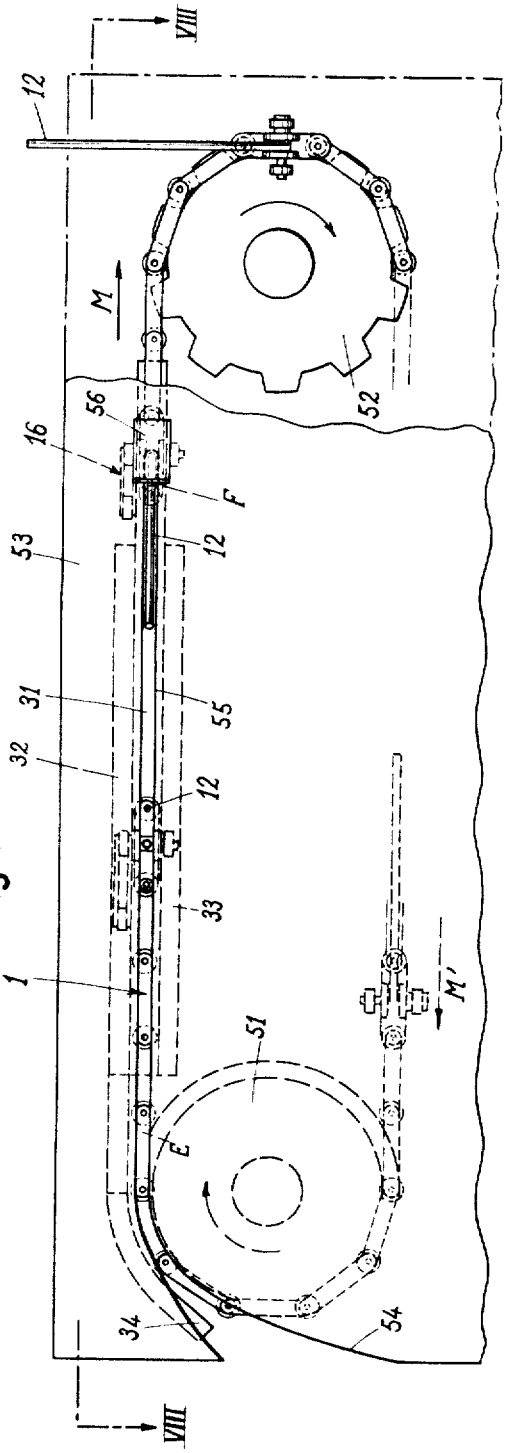
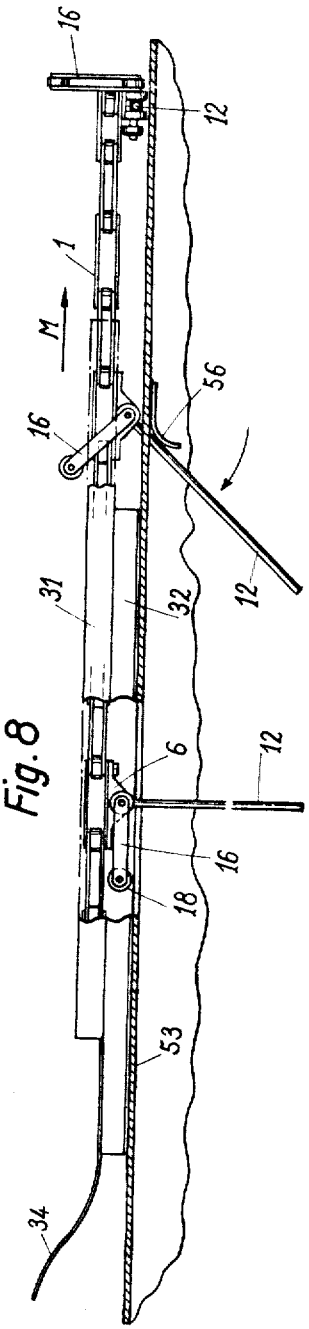
INVENTOR
RAOUL DULIEU

United States Patent Office 3,329,255
Patented July 4, 1967

3,329,255
DEVICE FOR HANDLING ELONGATE OBJECTS
Raoul Dulieu, La Giraude, Givry, France
Filed Oct. 11, 1965, Ser. No. 494,448
Claims priority, application France, Oct. 20, 1964, 992,016
8 Claims. (Cl. 198—170)

The present invention relates to an improved device suitable for use with an endless chain conveyor, and intended to effect automatic handling of elongated objects, such as cut plant stems (for example, sugar-cane).

The device according to the invention may be used more particularly to equip agricultural machines wherein it is required to effect the supply or removal of said stems— e.g. in the case of a machine for harvesting and cutting sugar-cane. It is however understood that the invention may be applied to any industrial machine in which similar handling problems arise.

It is known to mount, on endless chains, a succession of arms orthogonal to the chain. These arms move transversely with the chain and thus envelop a cylindrical surface resting upon the contour of the endless chain. However, such an arrangement is not very practical due to its bulk, dictated mainly by the curvilinear path of the arms in the region of the return pinions of the chain and by their return travel.

It is therefore one of the objects of the invention, which also uses as active elements handling arms carried by an endless chain, to overcome these disadvantages by virtue of simple and robust mechanical means which are easy to produce on a large scale and which also present great flexibility of adaptation to the required operating conditions.

According to the invention, the device for handling elongated objects, such as plant stems, which comprises an endless driving chain carrying transverse arms, is characterized in that each arm is articulated upon a fitting attached laterally to a link of the endless chain, and in that the axis of articulation of the arm is integral with a control finger which is orthogonal both to the said axis and to the said arm, guide elements being further provided along at least a part of the chain to dictate the position of the control finger with respect to the chain.

Under these conditions, the arms are deployed orthogonally to the chain during the active travel of the latter, and they fold along with their chain during the remainder of the travel, with the result that the bulk of the handling device is then a minimum.

The fitting carrying the arm is preferably constructed in such a way that the said arm is able, in the inactive position, to be folded parallel to the link of the chain carrying the said fitting.

According to one advantageous embodiment of the invention, the control finger carries two wheels or rollers located respectively at its ends and at its joint to the axis of articulation with the arm, whereas a U-shaped profile member is arranged parallel to the endless chain in the active part of the travel of the arm in order to maintain the control finger parallel to the said chain.

As for the guide elements intended to bring the handling arm into the active position orthogonal to the chain, the same preferably comprise a deflecting partition which extends obliquely from a position in which it meets the trajectory of the control fingers assumed to be at rest, to a position where it is parallel to the chain.

As a function of the configuration of the deflecting partition, it is possible to obtain a predetermined movement for the passage of the arms from the active position to the rest position or vice versa.

Conversely, the arms may be restored from the active position to the rest position by retracting stop elements located along their path.

Specific embodiments of the invention will now be described by way of example with reference to the accompanying drawings, in which:

FIG. 1 is a partial perspective diagram partially broken away showing an arm of the device according to the invention in the inactive position.

FIG. 2 is a similar view of the same arm in the active position.

FIG. 3 is a perspective diagram showing the passage of the arm from one position into the other.

FIG. 5 is the corresponding plan view.

FIG. 6 is a sectional view taken along the line VI—VI of FIG. 4.

FIG. 7 is an elevational view partially broken away of a second industrial construction for an agricultural machine.

FIG. 8 is the corresponding plan view, after sectioning along the line VIII—VIII of FIG. 7 and fragmentation.

FIG. 9 is an explanatory perspective diagram.

Figure 4:
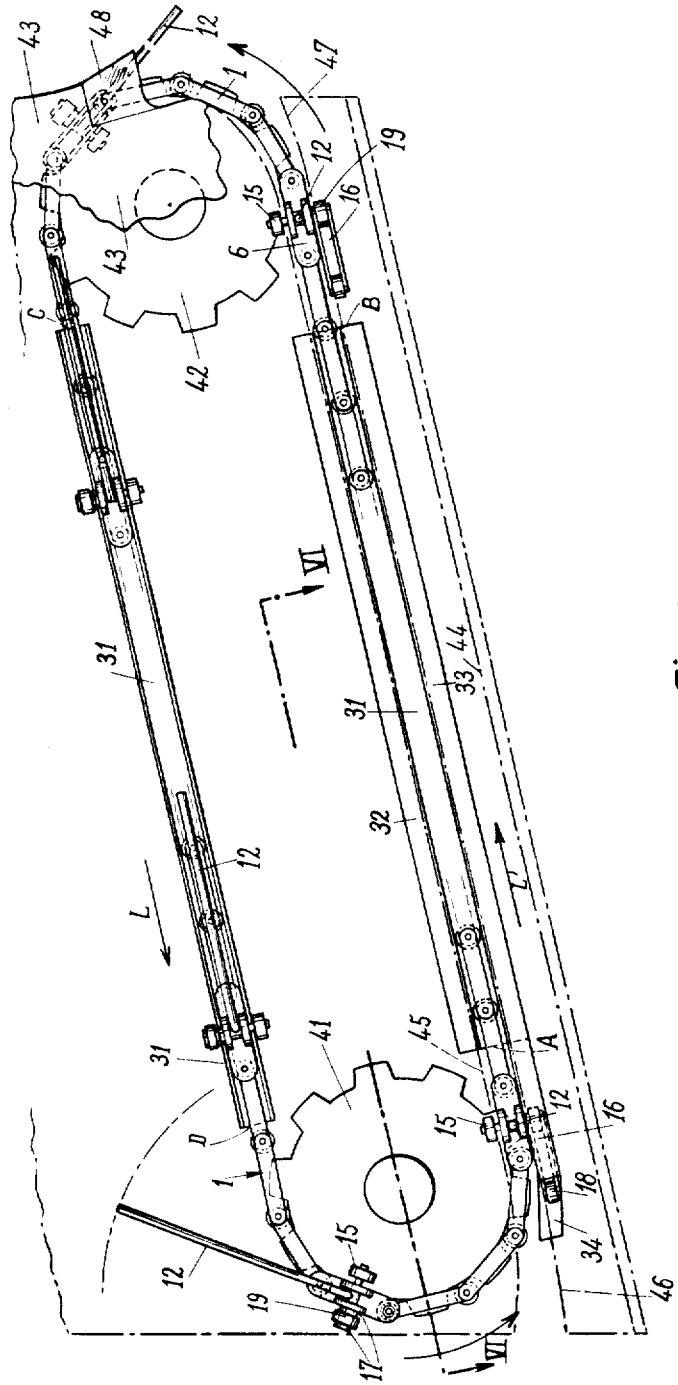
FIG. 4 is a view in elevation partially broken away of an industrial construction of the handling device for an agricultural machine.

With reference to FIGS. 1 and 2, shown at 1 is an endless chain upon which a handling device in accordance with the invention is arranged. The chain 1 which is mounted between two pinions not shown, at least one of which is a driving pinion, is constituted by links each comprising two parallel bars 3, these various links being mounted on axles 4 carrying wheels or rollers 5, according to an arrangement known per se.

The handling device comprises, fixed on the chain 1, a plurality of fixtures such as that shown at 6. Each fixture 6 is constituted by a plate secured laterally to one of the bars 3 by nuts 7 screwed on to screwthreaded prolongations 8 of the axles 4.

The fixture 6 carries two lugs 9 constituting a yoke in which there pivots an axle 11 orthogonal to the longitudinal axis of the supporting link. On the axle 11, a handling arm 12 is fixed orthogonally, being constituted by a rigid rod of appropriate length.

The axle 11 is continued beyond the lugs 9 by two swivel brackets 13, 14. The first carries a guide wheel or roller 15. The second is equipped with a finger 16 for the angular control of the arm 12. The finger 16 is constituted, for example, by two parallel and spaced bars 17 orthogonal both to the axle 11 and to the arm 12. The bars 17 are equipped at their free end with a rotary wheel or roller 18. A second rotary wheel or roller 19 is also mounted on the swivel mounting 14 between the bars 17.

It is clear that, by virtue of the respective angular orientations of the elements 11, 12 and 16, if the arm 12 is parallel to the longitudinal axis of the bars 3, the finger 16 is orthogonal to said axis and vice versa. Furthermore, in the example considered, the arm 12 is located substantially at the level of the chain 1, the finger 16 then being arranged beneath the level of said chain while the wheel or roller 15 is above, or vice versa.

The conveyor thus constructed is complemented by fixed guide elements placed in appropriate positions along the path of the chain 1 chosen as a function of the active travel provided for the arms 12. These guide elements serve to bring each arm 12 into its inactive position (parallel to its longitudinal axis of the link supporting it and hence to the median plane of the chain 1—FIG. 1) and into its active position (perpendicular to the aforesaid axle and therefore to the plane of the chain 1—FIG. 2).

Such elements comprise, for example, a rounded deflecting partition 21 (FIG. 2) oriented obliquely with respect to the median plane of the chain 1 and extending transversely from a position where it meets the trajectory T of the wheel or roller 18 into a position located on the other side of the same with respect to the median plane of the chain, and where it becomes parallel to said plane. The partition 21 is then prolonged throughout the active travel of the arm 12 by a rectilinear support band 22 of appropriate rigidity parallel to the plane of the chain 1.

The aforesaid guide elements have associated with them retracting stop elements such as 23 which, in the example considered, are intended to act upon the arm 12, assumed to be in the active position, in order to restore it to the inactive position. The stop elements 23 are constituted by plates comprising profiled ramps 24 located on the trajectory of the arms 12, and at positions such that the control fingers 16 are no longer in contact either with the oblique partition 21 or with the rectilinear support band 22.

The elements 21, 22 and 23 being arranged as shown in FIG. 2—i.e., in regions where the chain 1 presents a rectilinear travel—the mode of operation is as follows, further assuming that the movement of the chain 1 occurs in the direction F.

The arm 12 is first retracted along the chain 1 and moves parallel thereto, whereas the control finger 16 is disposed transversely with respect to the said chain (FIG. 1).

When the wheel or roller 18, describing the trajectory T, meets the partition 21, the finger 16, having regard to the advance of the fixture 6, is brought into the position of FIG. 2, in which it is parallel to the chain 1. This 90° rotation of the finger 16 (made progressive by the rounding of the partition 21) is expressed as a rotation in the same direction G of the arm 12 which thus comes to assume the active position.

The rotation of the arm 12 is the more rapid, all other things being equal, as the cavity of the partition is more accentuated. It is thus possible to arrange for the arm 12 to arrive gently in the active position, or on the contrary rapidly, like a whip, the velocity being amplified in accordance with the ratio of lengths of the parts 12 and 16.

The arm 12 is then maintained in the active position, even if it is subjected to a powerful force H opposite to the direction of movement so long as the wheel or roller 18 remains in contact with the rectilinear support band 22.

When the wheel or roller 18 has passed the end of the band 22, the arm 12 is free to return to the inactive position if the force H continues. In any event the arm 12 is automatically restored to this position when it strikes the ascending ramp 24 of the retracting stop element 23. The latter, opposing the progress of the arm 12, restores it along the chain 1 by rotation according to J. This movement is still more rapid as the slope of the ramp 24 is steeper.

If the support band 22 extends along a length substantially in excess of the relative spacing of two fixtures 6, the chain 1 may possess a succession of arms 12 in the active position, all the other arms being retracted. The bulk of the handling device outside its active zone may thus be particularly limited since it is virtually reduced to that of the chain 1.

The handling device of the type to which the invention relates may be associated with a passageway for the movement of objects to be handled. In this case, the endless chain is advantageously disposed behind one of the walls of said passageway, a slot being made in said wall opposite the positions of the chain corresponding to the active travel of the arms 12, in order to permit the translation of the latter.

The wall in question may also be suitably pierced to permit the arms 12 to move into the active positions or to be retracted.

Of course, a plurality of handling devices similar to the foregoing may be associated with one and the same wall, the active runs provided by the arms being parallel or otherwise. It is also possible to place the chain along the two opposite walls of the passage.

FIG. 9 gives an exemple of such an arrangement. At 25 is shown the ascending passageway intended to transport, e.g., sugar-cane stems. On each side of the walls 26a, 26b of the passage, chains 1a, 1b are arranged, on which the arms 12a, 12b, in the active position, pass through parallel slots 27a, 27b of different heights, made respectively in the walls 26a, 26b considered. According to the handling requirements, the active runs of the two chains 1a, 1b may be corresponding or staggered, may be of the same length or of unequal lengths. In the case of FIG. 9, the cane stems are thus, along at least a part of their travel, maintained at two different levels and are thereby able to move vertically.

Various possible arrangements of the handling device in accordance with the invention with respect to the walls of the passageway will be described hereinbelow, with reference to FIGS. 4 to 8.

According to the arrangement shown in FIG. 3, where the fixtures 6 and their accessories have a considerable weight and the fingers 12 are required to be subject, in the active position, to powerful forces, it is provided to house the chain 1 along the whole of its rectilinear travel in a U-shaped profile member 31 which is open on the side near the fixtures 6. The arms of the profile member 31 act as tracks for the wheels or rollers 5.

At the level of the active run provided for the arms 12, the profile member 31 is flanked by two U-shaped profile members 32, 33 adjacent and orthogonal to the first, facing one another, and with their free arms separated by a distance D permitting passage of the arms 12. The profile member 32 effects guidance of the wheel or roller 15 of the swivel mounting 13 (here shown in the reversed position with respect to FIG. 1). The profile member 33 acts as a guide to maintain the control finger 16 parallel to the chain 1. All the reactions to the arm 12 are absorbed, even during operation, by rolling support of the wheels or rollers 18 and 19 against the arms of the said profile member 33. At the entry to the profile 33 with respect to the direction of movement K of the chain 1, there is arranged a deflecting partition 34 which intersects the trajectory T of the wheels or rollers 18 and brings the fingers 16 progressively into alignment with the said profile member 33. The partition 34 is supported on edge against the profile member 31.

By virtue of this arrangement, all the moving parts of the handling device, except for the arms 12, are enveloped during the active portions of the run by a profile housing of very small bulk, which simultaneously achieves the protection, the guidance and the support necessary for the active elements.

Depending upon the nature of the handling operations to be performed, it is provided according to the present invention to place the deflecting partitions and the retracting stop elements in positions defined with respect to the circuit of the chain, the engagement and disengagement movements of the said arms being greatly different according to whether these static control elements are placed in a rectilinear path or on the contrary in a curvilinear path on said circuit. These means are applied to the two embodiments which will now be described hereinbelow, and which both relate to a transport or conveyor passageway for cut stems, such as the stems of sugar-cane.

FIG. 4 shows at 41, 42 the two pinions supporting the chain 1 which moves in the direction L, L′ behind one of the walls 43 of the passageway, the floor 44 of which ascends in the direction L′.

In this construction, a guide system similar to that of FIG. 3 is adopted. Since the active travel provided for the fingers 12 corresponds to the lower run of the chain 1, the triple profile member 31 32, 33 is installed in this part between the points A and B. The profile member 32 is continued upstream of the point A with respect to the direction L', but the deflecting partition 34 is again substantially located in the rectilinear part of the travel of the fingers 16. On the contrary, in the upper rectilinear part C, D, the chain 1 is guided only by the single profile member 31.

In order to permit the entry of the arms 12 into the passageway and their projection, the wall 43 is pierced by a longitudinal slot 45 which is flared at the entry at 46 and at the exit 47.

On the other hand, the retracting stop elements 48 are here mounted on the walls 43 opposite the pinion 42, and consequently in a position where the chain 1 consequently follows a curvilinear trajectory.

Under these conditions, when the chain 1 is in motion, the arms 12 describe circular involutes in rotation about the pinion 41. Then, when the control fingers 16 come into contact with the partition 34, the fixture 6 already being oriented along AB, the arm 12 is projected into the passage with a whiplike movement, but along a planar trajectory. The arms 12 may thus come to push the cut stems as soon as they have penetrated into the passageway, and they promote their introduction.

At the level of the pinion 42, however, the arms 12 describe a complex figure which is of cylindrical nature until they come into contact with the stop element 48. From that moment, the arms progressively become folded and complete their movement in a plane parallel to that of the chain 1. This involute movement is favourable to the scattering of the stems, which thus leave the exit of the passageway largely clear.

In the embodiment of FIGS. 7 and 8, on the contrary, where the chain 1 moving in the direction M, M' is supported by pinions 51, 52 located behind a wall 53, the active run is in the upper part of the chain between the points E and F, where consequently the triple profile member 31, 32, 33 is mounted.

In this variant, the deflecting partition 34 is arranged in the curvilinear part of the circuit of the chain 1, passing from one side to the other of the plane of the pinion 51. Opposite, the wall 53 possesses a wide indentation 54 continued by a longitudinal slot 55 terminated by an incurved retracting stop means 56 located inside the passageway.

Having regard to the position of the static control elements 34 and 56, the fingers 12 exhibit at the entry to the passageway a complex enveloping movement which facilitates their engagement between the stems, and they therefore become free subsequently without jolts when they pass to the other side of the wall 53.

The means provided by the invention thus permit any type of motion to be imparted to the arms 12.

Obviously, the invention is not limited to the embodiments described, and numerous variants may be made thereto.

More particularly, the arms 12 might be arranged above and below the chain, the angle of parts 12 and 16 might be other than 90°.

Thus, it is possible to arrange an entry and an exit both in the rectilinear parts of the chain circuit or on the contrary both in the curvilinear parts. The chain circuit itself may comprise more than two parallel arms if return pinions are provided. Similarly, the pinions supporting the chain may present axes having a direction other than horizontal. The arms 12 might also have a form other than rectilinear, appropriate to the handling operation prescribed. Similarly, if it were desired to deaden the engagement of the arms 12, deflecting partitions such as 34 might be mounted on springs.

I claim:

1. An endless chain conveyor that circulates in a path disposed in a plane, comprising a plurality of links that are parallel to each other and to said plane and are pivotally interconnected about a plurality of axes that are parallel to each other and perpendicular to said plane, a plurality of fixtures secured to the outer sides of a plurality of said links, pusher arms extending laterally of the conveyor and carried by said fixtures for swinging movement relative to said fixtures about axes that are parallel to the links that carry said fixtures and perpendicular to the length of adjacent portions of the conveyor chain, an actuator arm in unitary assembly with and disposed at a substantial angle to each said pusher arm and swingable in a plane prallel to said claim link axes, and fixed cam means engageable with the actuator arms to control the position of the pusher arms.

2. A conveyor as claimed in claim 1, said pusher arms being on about the same level as the links which carry them.

3. A conveyor as claimed in claim 2, and guide roller means rotatable about said pusher arm axis on the side of said pusher arm opposite said actuator arm, and guide channels for guidingly receiving said chain and actuator arms and guide roller means.

4. A conveyor as claimed in claim 3, and further guide roller means rotatably mounted on said actuator arm coaxially with said first-mentioned guide roller means.

5. A conveyor as claimed in claim 1, each said fixture having a pair of outwardly extending lugs thereon that are spaced apart in the direction of said pusher arm axes, the associated said pusher arm being disposed between said lugs and mounted on an axle that passes through both said lugs.

6. A conveyor as claimed in claim 5, said actuator arm being disposed on the side of one of said lugs opposite said pusher arm.

7. A conveyor as claimed in claim 6, and guide roller means rotatable on and about said axle on the side of the other said lug which is opposite said pusher arm, and guide channels for guidingly receiving said chain and acutator arms and guide roller means.

8. A conveyor as claimed in claim 7, and further guide roller means rotatably mounted on said actuator arm coaxially with said first-mentioned guide roller means.

References Cited

UNITED STATES PATENTS 2,714,441   8/1955   Nolt _____ 198—170

EVON C. BLUNK, *Primary Examiner.*

A. C. HODGSON, *Assistant Examiner.*